United States Patent
Unanua Hermoso De Mendoza

(10) Patent No.: US 9,279,266 B2
(45) Date of Patent: Mar. 8, 2016

(54) REINFORCED HOLLOW FOR A WIND TURBINE TOWER

(71) Applicant: Gamesa Innovation & Technology, S.L., Sarriguren (Navarra) (ES)

(72) Inventor: Pablo Unanua Hermoso De Mendoza, Madrid (ES)

(73) Assignee: GAMESA INNOVATION & TECHNOLOGY, S. L., Sarriguren (Navarra) (ES)

( * ) Notice: Subject to any disclaimer, the term of this patent is extended or adjusted under 35 U.S.C. 154(b) by 0 days.

(21) Appl. No.: 14/497,759

(22) Filed: Sep. 26, 2014

(65) Prior Publication Data

US 2015/0107179 A1 Apr. 23, 2015

(30) Foreign Application Priority Data

Oct. 18, 2013 (ES) .................................. 201300989

(51) Int. Cl.
| | |
|---|---|
| *E04H 12/00* | (2006.01) |
| *F03D 11/04* | (2006.01) |
| *E04B 1/92* | (2006.01) |
| *E04H 9/00* | (2006.01) |
| *E04H 12/34* | (2006.01) |

(52) U.S. Cl.
CPC *E04H 12/00* (2013.01); *E04B 1/92* (2013.01); *E04H 9/00* (2013.01); *E04H 12/34* (2013.01); *F03D 11/04* (2013.01); *F05B 2240/912* (2013.01)

(58) Field of Classification Search
CPC ........... E04H 12/34; E04H 9/00; E04H 12/00; E04B 1/92
USPC ................. 52/651.01, 651.4, 651.06, 651.07, 52/651.08, 651.09, 651.1, 651.11, 651.02, 52/40, 834–835, 843–844, 848, 854, 52/DIG. 4; 174/66–67; 220/241–242
See application file for complete search history.

(56) References Cited

U.S. PATENT DOCUMENTS

| | | | | |
|---|---|---|---|---|
| 6,532,700 | B1 * | 3/2003 | Maliszewski et al. | ............. 52/40 |
| 2008/0034675 | A1 * | 2/2008 | Kristensen | ........................ 52/40 |
| 2010/0071301 | A1 * | 3/2010 | Herrius de Roest | ....... 52/651.07 |
| 2011/0219711 | A1 * | 9/2011 | Bagepalli et al. | ............. 52/204.1 |
| 2012/0049259 | A1 * | 3/2012 | Kim | ............................. 257/300 |

FOREIGN PATENT DOCUMENTS

| | | | | |
|---|---|---|---|---|
| CA | 2 464 623 | A1 | 5/2003 | |
| DE | 3504840 | * | 6/1986 | ............. E04H 12/08 |
| EP | 1 856 410 | | 6/2010 | |

* cited by examiner

*Primary Examiner* — Beth Stephan
(74) *Attorney, Agent, or Firm* — Ladas & Parry LLP

(57) ABSTRACT

Reinforced hollow for a wind turbine tower comprising a lower ring (2) that determines an opening (3) for the installation of an access door (not represented) inside the tower (1). The hollow incorporates at least one structural element (4) that is fastened on both sides of the opening (3) of the tower's lower ring (2), providing the rigidness necessary to attach a door and permit the reduction of the thickness of the ring by 10-20%.

6 Claims, 3 Drawing Sheets

REINFORCED HOLLOW FOR A WIND TURBINE TOWER

FIELD OF THE INVENTION

The present invention is related with wind turbine tower doors and, particularly with the hollows cut into wind turbines to install these doors.

BACKGROUND OF THE INVENTION

Conventional wind turbines comprise a tower firmly anchored to the ground, a nacelle at the top of the tower, and a rotor equipped with at least one blade. Recent tendencies in wind turbine construction entail increased power and towers of greater height.

Wind turbine towers are constructed in sections, which comprise flanges and rings, that determine a thickness of 15-60 mm depending on the height of the tower and the rotor installed in the wind turbine. Each section is coupled to the adjacent section (upper and/or lower) by flanges that are bolted together.

The lower part of the wind turbine tower has an access door that enables workers to enter the wind turbine to undertake maintenance tasks. This access door is installed in a hollow or through opening made into the lower ring of the tower. The problem addressed here is the loss of ring strength and rigidness when this hollow is made.

Wind turbine tower manufacturers normally tend to reinforce this area with frames for the door or by increasing the thickness of the ring in the area, but this extra rigidness proves complex and expensive to produce.

An example of solutions of this sort is described in patent CA 2464623, which claims a structural member (frame) that is welded onto the hole made on the lower part of the tower to accommodate a door.

Other solutions are known such as the one described in patent EP 1856410, which proposes a lower ring manufactured in two parts onto which a door frame is mounted so that one of the parts of the ring, the one onto which the door will be mounted, will be thicker than the other part of the ring. This thus permits a thinner frame to be installed depending on the increase in ring thickness. However, this solution is inefficient, since it substantially increases the weight and mass of this lower tower ring.

DESCRIPTION OF THE INVENTION

One object of the invention is to provide at least one structural element that enables the incorporation of a door to the tower's lower ring that would enable the ring thickness to be reduced.

Another object of the invention is to provide at least one structural element that enables the incorporation of a door to the tower's lower ring without the need to have previously installed a door frame.

For the foregoing, the invention envisions the incorporation of at least one structural element comprising a pair of beams to provide the rigidness necessary to attach a door to the tower's lower ring and thus permit the reduction of the ring thickness by 10-20%.

The structural element is mounted by welding on both sides of the lower ring opening and can be mounted inside or outside the tower. This welded coupling is further strengthened by applying currently known State of the Art methods for enhancing resistance to fatigue such as Burr Grinding or Tig Dressing.

The door, in turn, can be secured either to the opening in the ring or to the structural element, and door hinges can be secured to either the ring or structural element.

These and other aspects of the invention will be described in more detail with the help of the drawings shown below.

DESCRIPTION OF A PREFERENTIAL EMBODIMENT

Figure 1:
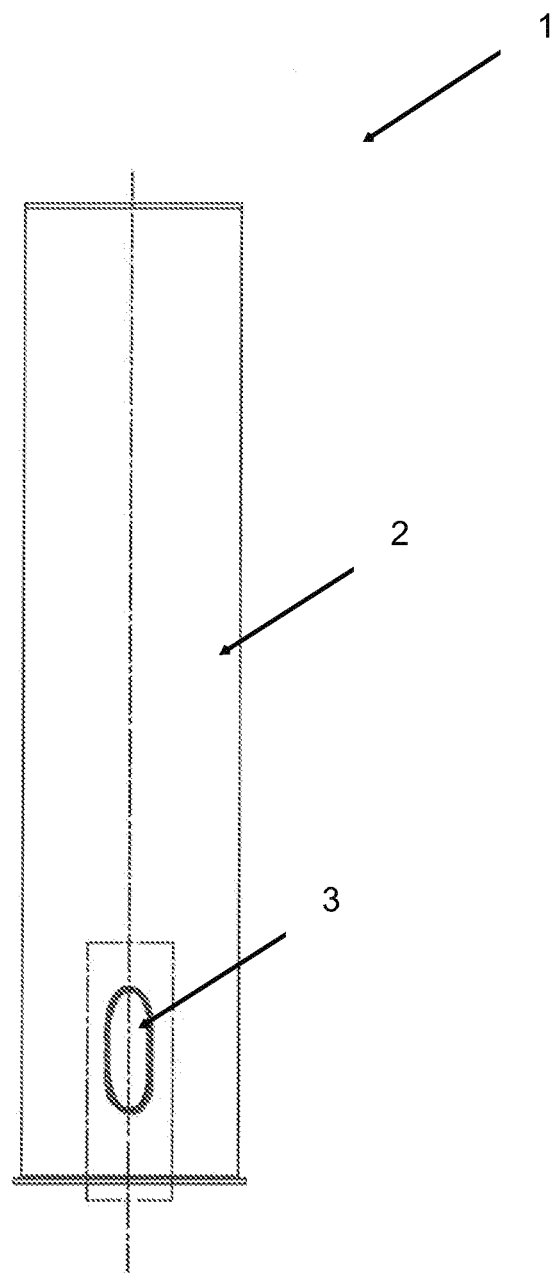
FIG. 1 illustrates an front view of a wind turbine tower with a hollow in the lower ring for incorporating the access door.

FIG. 1 illustrates the lower ring (2) of a wind turbine tower (1) that has an opening (3) for subsequently installing an access door (not represented).

Figures 2, 3:
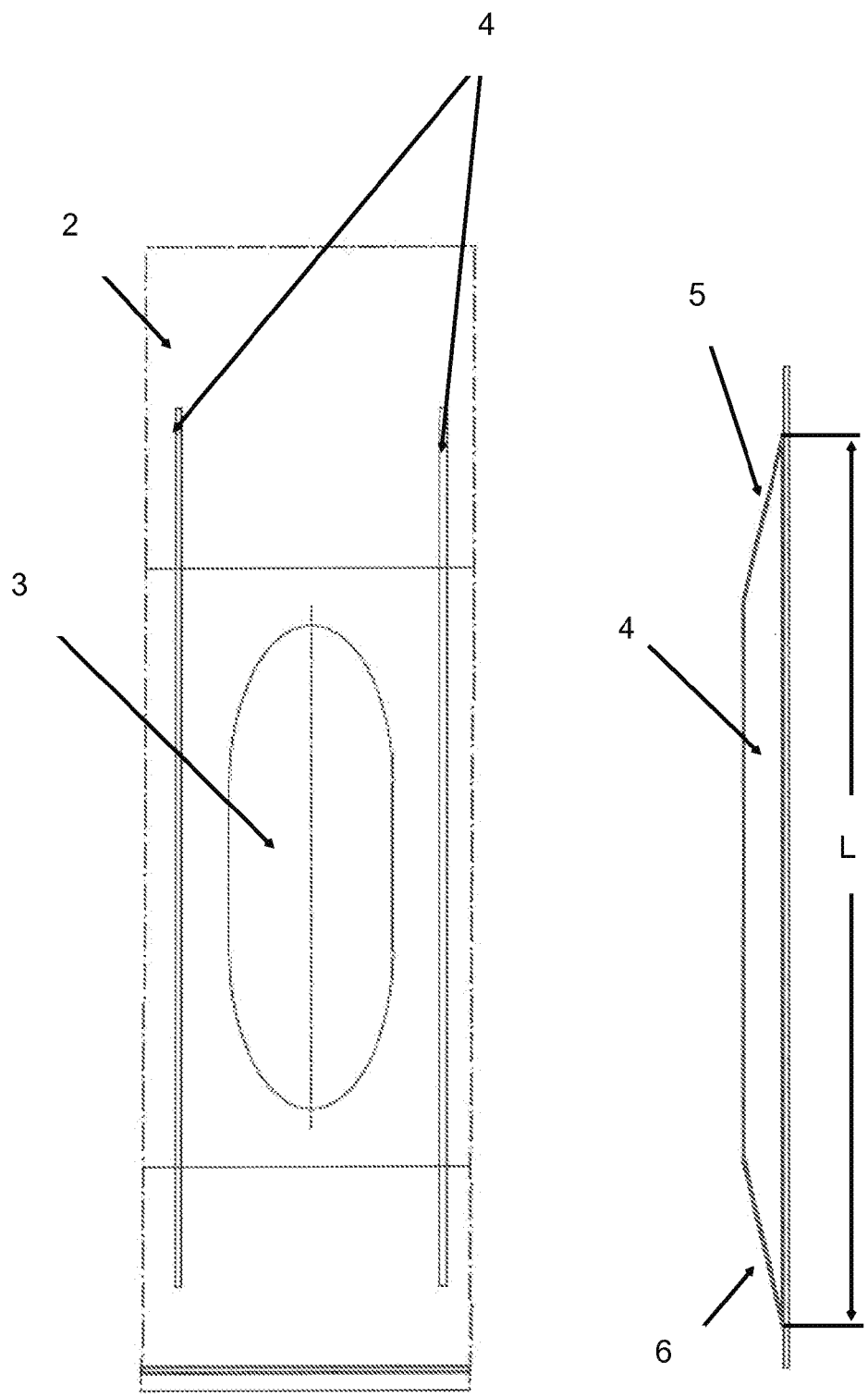
FIGS. 2 and 3 are front and side views of the wind turbine hollow according to the invention.
Figure 4:
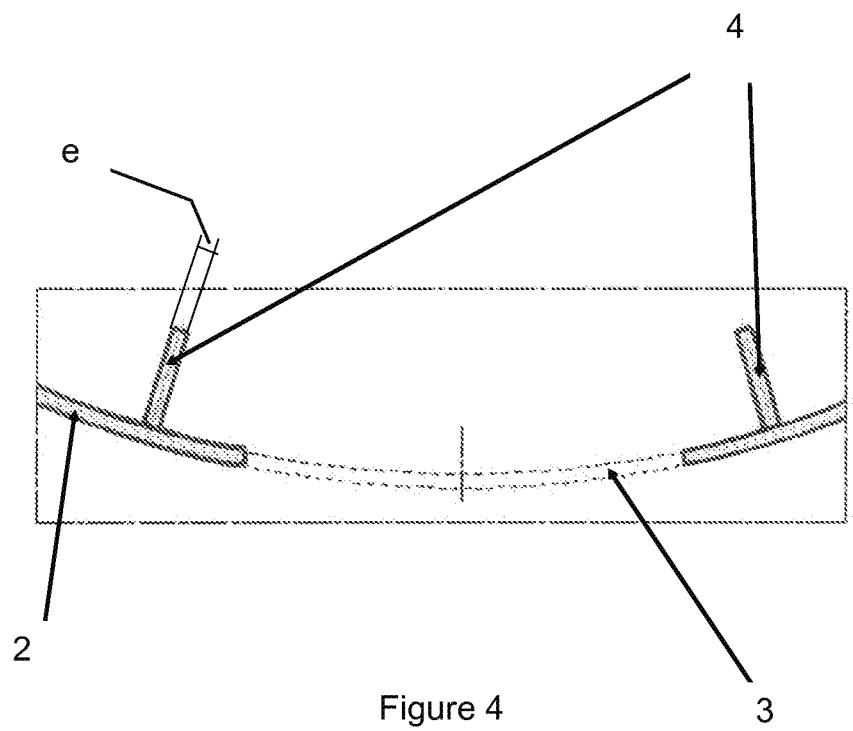
FIG. 4 is a cross section illustrating the hollow on the lower ring of the tower according to the invention.

The invention, as illustrated in FIG. 2, incorporates at least one structural element (4) comprising a pair of beams on both sides of the opening (3) of the lower ring (2) that can be mounted either inside or outside the tower and provide the rigidness necessary to be able to install a door on the lower ring (2) of the tower.

Each one of the structural elements (4), i.e., each beam, mounted on the sides of the opening (3) in the lower ring (2) of the tower, determines its upper (5) and lower (6) inclined edges (see FIG. 3). This inclination within a range of ¼-⅕ guarantees the minimization of maximum stress while augmenting the resistance to fatigue of the structural element (4).

The beams preferentially determine a length (L) of 3-5 meters in height and a thickness (e) of 20-35 mm, though this would depend on the size of the opening (3) made in the lower ring (2).

The structural element (4) is fastened to the lower ring (2) from inside the tower through welding, although it could also be done from the outside, complementing this welding in both cases with conventional techniques such as Burr Grinding or Tig Dressing.

The door hinges (not represented) can be fastened to the ring (2) or the structural reinforcement element (4) of the invention.

The invention claimed is:

1. A reinforced hollow for a wind turbine tower that comprises a lower ring (2) that comprises an opening (3) for installing an access door inside the wind turbine tower,
   wherein the reinforced hollow incorporates at least one structural element (4) that is fastened to the lower ring (2),
   wherein the at least one structural element (4) comprises at least two beams, wherein at least two beams are mounted onto the lower ring (2) on opposite sides of the opening (3),
   wherein the at least two beams are independent of the opening (3) and are not connected to the opening (3) such that the at least two beams are not a part of a frame for the opening (3), and
   wherein the beams of the structural element (4) have upper (5) and lower (6) inclined ends.

2. The reinforced hollow for a wind turbine tower according to claim 1, wherein the structural element (4) is welded to the ring (2).

3. The reinforced hollow for a wind turbine tower according to claim 1, wherein the upper and lower inclined ends (5, 6) of the beams of the structural element (4) are in a range of ¼ to ⅕.

4. The reinforced hollow for a wind turbine tower according to claim 1, wherein access door hinges are fastened to the structural element (4) or to the lower ring (2) of the wind turbine tower.

5. The reinforced hollow for a wind turbine tower according to claim 1, wherein the beams on the structural element (4) have a length (L) of 3-5 meters and a thickness (e) of 20-35 mm.

6. The reinforced hollow for a wind turbine tower according to claim 1, wherein the structural element (4) can be fastened inside or outside the wind turbine tower.

* * * * *